United States Patent [19]
Phelps et al.

[11] Patent Number: 5,530,083
[45] Date of Patent: Jun. 25, 1996

[54] SILICONE-POLYCARBONATE BLOCK COPOLYMERS AND POLYCARBONATE BLENDS HAVING REDUCED HAZE, AND METHOD FOR MAKING

[75] Inventors: Peter D. Phelps, Schenectady; Eugene P. Boden, Scotia; Gary C. Davis, Albany; Danielle R. Joyce, Clifton Park, all of N.Y.; James F. Hoover, Evansville, Ind.

[73] Assignee: General Electric Company, Schenectady, N.Y.

[21] Appl. No.: 278,208

[22] Filed: Jul. 21, 1994

[51] Int. Cl.$^6$ .................................................. C08G 77/448
[52] U.S. Cl. ...................... 528/25; 528/26; 528/29; 525/464
[58] Field of Search .................. 528/26, 25, 29; 525/464

[56] References Cited

U.S. PATENT DOCUMENTS

| | | | |
|---|---|---|---|
| 4,600,632 | 7/1986 | Paul et al. | 428/220 |
| 4,732,949 | 3/1988 | Paul et al. | 525/464 |
| 5,100,960 | 3/1992 | Grigo et al. | 525/464 |

FOREIGN PATENT DOCUMENTS 376052  7/1990  European Pat. Off. .

*Primary Examiner*—Ralph H. Dean, Jr.
*Attorney, Agent, or Firm*—William H. Pittman

[57] ABSTRACT

A method is provided for making silicone polycarbonate block copolymers and polycarbonate blends thereof having reduced haze. Silicone polycarbonate block copolymer formation is effected by using a phase transfer catalyst to generate polycarbonate oligomers having at least one terminal haloformate group followed by the late addition of hydroxyaryl terminated polydiorganosiloxane.

6 Claims, No Drawings

SILICONE-POLYCARBONATE BLOCK COPOLYMERS AND POLYCARBONATE BLENDS HAVING REDUCED HAZE, AND METHOD FOR MAKING

BACKGROUND OF THE INVENTION

The present invention relates to silicone polycarbonate block copolymers and polycarbonate blends thereof having reduced haze and to a method for making. More particularly, polycarbonate oligomers having at least one terminal haloformate group are initially formed under interfacial reaction conditions and thereafter reacted with polydiorganosiloxane having terminal hydroxyaryl groups.

Silicone-polycarbonate block copolymers have been recognized for their low temperature ductility and flame retardance. These block copolymers can be made by introducing phosgene under interfacial reaction conditions into a mixture of a dihydric phenol, such as bisphenol A (BPA), and an hydroxyaryl terminated polydiorganosiloxane. The polymerization of the reactants can be facilitated by use of a tertiary amine catalyst. Although the resulting silicone polycarbonate block copolymer has been found to have improved flame retardance compared to polycarbonate, the clarity of the silicone polycarbonate copolymer is often adversely affected.

Experience has shown that if phosgene is introduced into a mixture of dihydric phenol and phenol capped polydiorganosiloxane under interfacial reaction conditions, various reactions can occur, because dihydric phenol and phenol capped polydiorganosiloxane oligomerize at different rates. As a result, several polycarbonate products can be formed including siloxane rich copolymer and polycarbonate substantially free of silicone. This can result in silicone polycarbonate block copolymer which may be extremely hazy or nearly opaque.

It would be desirable therefor to be able to make silicone polycarbonate block copolymer having substantially reduced haze and substantially improved transmittance. It also would be desirable to provide an improved method for making such improved silicone polycarbonate block copolymer.

As used hereinafter with respect to the description of the silicone polycarbonate block copolymer made in accordance with the practice of the invention, the term "haze" means that percentage of transmitted light which in passing through the specimen deviates from the incident beam by forward scattering (ASTM D 1003-61).

As used hereinafter with respect to the description of the silicone polycarbonate block copolymer of the invention, the term "transmittance" means the ratio of transmitted to incident light in accordance with Method E 308 (ASTM D 1003-61).

SUMMARY OF THE INVENTION

The present invention is based on the discovery that silicone polycarbonate block copolymers having improved transmittance and reduced haze can be made by initially introducing phosgene under interfacial reaction conditions into a dihydric phenol mixture having an effective amount of a phase transfer catalyst and a pH of about 8 to about 12. Phosgenation is continued to effect a sufficient build-up in chloroformate terminated polycarbonate, followed by the introduction of polydiorganosiloxane having terminal hydroxyaryl groups.

It also has been found, that blends of polycarbonate and silicone polycarbonate block copolymer made in accordance with the method of the present invention can have reduced haze and improved transmittance.

STATEMENT OF THE INVENTION

There is provided by the present invention, a silicone polycarbonate block copolymer having a haze percent of less than about 10 and from about 0.5% to about 10% by weight of chemically combined polydiorganosiloxane having an average block size of about 10 to about 100 chemically combined diorganosiloxy units.

In another aspect of the present invention, there is provided a blend having a haze percent of less than about 30 comprised of (A), polycarbonate and (B), a silicone polycarbonate block copolymer having about 0.5% to about 80% by weight of polydiorganosiloxane with an average block length of about 10 to about 100 chemically combined diorganosiloxy units, where the silicone polycarbonate block copolymer is present in the polycarbonate blend in an amount sufficient to provide by weight, from about 0.5% to about 10%, and preferably about 5% of polydiorganosiloxane, based on the weight of (A) and (B).

In a further aspect of the present invention, there is provided a method for making a silicone polycarbonate block copolymer which can be blended with polycarbonate to produce a polycarbonate blend having a haze value of less than about 30, where the silicone polycarbonate block copolymer has from about 0.5% to about 80% by weight of chemically combined polydiorganosiloxane with an average block length of about 10 to about 100 chemically combined diorganosiloxy units, which method comprises, (A) adding phosgene to bisphenol under interfacial reaction conditions and at a pH in the range of from about 10 to about 12 in the presence of an amount of a phase transfer catalyst which is effective for catalyzing reaction between phosgene and the bisphenol until about 1 to about 99 mole percent of phosgene has been added, based on the total moles of available hydroxy groups of the bisphenol, (B) lowering the pH of the mixture of (A) to a value in the range of about 8.0 to about 9.0, and while maintaining such pH range, continuing to add phosgene to the mixture until there is present at least a sufficient amount, and up to about a 5 mole % excess of phosgene which is adequate to generate enough chloroformate end groups capable of reacting with available bisphenol hydroxy groups and any hydroxyaryl groups present in the terminal position of polydiorganosiloxane subsequently added to the mixture to satisfy the desired polydiorganosiloxane weight percent requirements in the resulting silicone polycarbonate block copolymer, (C) introducing into the mixture of (B), the predetermined weight percent of the hydroxyaryl polydiorganosiloxane, (D) raising the pH of the resulting mixture of (C), to a value in the range of about 10 to about 12, and, (E) eliminating any excess chloroformate groups in the mixture of (D).

Some of the hydroxyaryl terminated polydiorganosiloxanes which can be used in the practice of the invention, are phenol-siloxanes included within the formula,

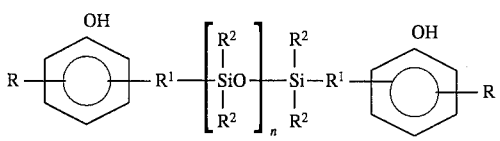

where R is selected from hydrogen, and the same or different radical selected from halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer equal to 1 to 1000 inclusive and has an average value of from 10 to about 100 inclusive. Preferably, n has a value of from 25 to 75, while 40 to 60 is particularly preferred.

The hydroxyaryl terminated polydiorganosiloxane can be made by effecting a platinum catalyzed addition between a siloxane hydride of the formula,

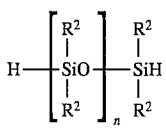

and an aliphatically unsaturated monohydric phenol. A similar procedure is shown in copending application Ser. No. 08/046,444 filed Apr. 16, 1993, now U.S. Pat. No. 5,357,022 which is incorporated herein by reference, where $R^2$ and n are as previously defined.

Some of the radicals included within R in the above formula are halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within $R^1$ are, for example, dimethylene, trimethylene and tetramethylene. Radicals included within $R^2$ are, for example, $C_{(1-8)}$ alkyl radicals, haloalkyl radicals such as trifluoropropyl and cyanoalkyl radicals; aryl radicals such as phenyl, chlorophenyl and tolyl. $R^2$ is preferably methyl, or a mixture of methyl and trifluoropropyl, or a mixture of methyl and phenyl.

Some of the aliphatically unsaturated monohydric phenols, which can be used to make the hydroxyaryl terminated polydiorganosiloxanes are, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propargylphenol, 2-allyl-4,6-dimethylphenol, 2-allyl-4-bromo-6-methylphenol, 2-allyl-6-methoxy-4-methylphenol and 2-allyl-4,6-dimethytphenol.

Among the preferred phase transfer catalysts which can be utilized in the practice of the present invention there are included, $(R^3)_4Q^+X$, where $R^3$ is a member selected from the same or different, $C_{(1-10)}$ alkyl groups, Q is a nitrogen or phosphorus atom, and X is a member selected from a halogen atom, or an —$OR^4$ group, and $R^4$ is a member selected from hydrogen, a $C_{(1-8)}$ alkyl group and a $C_{(6-18)}$ aryl group.

Some of the phase transfer catalysts (PTC) which can be used in the practice of the invention are,

[$CH_3(CH_2)_3$]$_4$NX

[$CH_3(CH_2)_3$]$_4$PX

[$CH_3(CH_2)_5$]$_4$NX

[$CH_3(CH_2)_6$]$_4$NX

[$CH_3(CH_2)_4$]$_4$NX $CH_3[CH_3(CH_2)_2]_3$NX $CH_3[CH_3(CH_2)_3]_3$NX, where X is selected from Cl⁻, Br⁻ or —$OR^4$.

An effective amount of a PTC is 0.1% to 10% by weight, and preferably 0.5% to 2% based on the weight of bisphenol in the phosgenation mixture.

Several of the bisphenols which can be phosgenated in accordance with the practice of the present invention are for example, resorcinol 4-bromoresorcinol hydroquinone 4,4'-dihydroxybiphenyl 1,6-dihydroxynaphthalene 2,6-dihydroxynaphthalene bis(4-hydroxypenyl)methane bis(4-hydroxyphenyl)diphenylmethane bis(4-hydroxyphenyl)-1-naphthylmethane 1,1-bis(4-hydroxyphenyl)ethane 1,2-bis(4-hydroxyphenyl)ethane 1,1-bis(4-hydroxyphenyl)-1-phenylethane 2,2-bis(4-hydroxyphenyl)propane ("bisphenol A")

2-(4-hydroxyphenyl)-2-)3-hydroxyphenyl)propane 2,2-bis(4-hydroxyphenyl)butane 1,1-bis(4-hydroxyphenyl)isobutane 1,1-bis(4-hydroxyphenyl)cyclohexane 1,1-bis(4-hydroxyphenyl)cyclododecane trans-2,3-bis(4-hydroxyphenyl)-2-butene 2,2-bis(4-hydroxyphenyl)adamantane (α,α' -bis(4-hydroxyphenyl)toluene bis(4-hydroxyphenyl)acetonitrile 2,2-bis(3-methyl-4-hydtoxyphenyl)propane 2,2-bis(3-ethyl-4-hydroxyphenyl)propane 2,2-bis(3-n-propyl-4-hydroxyphenyl)propane 2,2-bis(3-isopropyl-4-hydroxyphenyl)propane 2,2-bis(3-sec-butyl-4-hydroxyphenyl)propane 2,2-bis(3-t-butyl-4-hydroxyphenyl)propane 2,2-Bis(3-cyclohexyl-4-hydroxyphenyl)propane 2,2-bis(3-allyl-4-hydroxyphenyl)propane 2,2-bis(3-methoxy-4-hydroxyphenyl)propane 2,2-bis(4-hydroxyphenyl)hexafluoropropane 1,1-dichloro-2,2-bis(4-hydroxyphenyl)ethylene 1,1-dibromo-2,2-bis(4-hydroxyphenyl)ethylene 1,1-dichloro-2,2-bis(5-phenoxy-4-hydroxyphenyl)ethylene 4,4'-dihydroxybenzophenone 3,3-bis(4-hydroxyphenyl)-2-butanone 1,6-bis(4-hydroxyphenyl)-1,6-hexanedione ethylene glycol bis(4-hydroxyphenyl)ether bis(4-hydroxyphenyl)ether bis(4-hydroxyphenyl)sulfide bis(4-hydroxyphenyl)sulfoxide bis(4-hydroxyphenyl)sulfone 9,9-bis(4-hydroxyphenyl)fluorene 2,7-dihydroxypyrene 6,6'-dihydroxy-3,3,3',3'-tetramethylspiro(bis)indane("spirobiindane bisphenol")

3,3-bis(4-hydroxyphenyl)phthalide 2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole, Among the polycarbonates which can be blended with the silicone-polycarbonate block copolymer are those formed by phosgenating bisphenol as previously described and preferably bisphenol A (BPA). The BPA polycarbonate preferably has an intrinsic viscosity (IV) of from 0.35 to 1.8 dl/g in chloroform at 25° C. Additional procedures which can be used to make polycarbonates useful in blending with silicone-polycarbonate block copolymer, include polycarbonate made by ester interchange under melt polymerization conditions.

In the practice of one form of the present invention, the silicone-polycarbonate block copolymer can be made by initially blending bisphenol with an organic solvent and an effective amount of phase transfer catalyst. Sufficient alkali metal hydroxide can be utilized to raise the pH of the the bisphenol reaction mixture prior to phosgenation, to a value of about 10.5. This can result in the dissolution of some of the bisphenol into the aqueous phase.

Suitable organic solvents which can be used are, for example, chlorinated aliphatic hydrocarbons, such as methylene chloride, chloroform, carbon tetrachloride, dichlorbethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Aqueous alkali, or alkaline earth metal hydroxide addition can be used to maintain the pH of the phosgenation mixture near the pH set point, which may be in the range of between about 10 to about 12. Some of the alkali metal or alkaline earth metal hydroxides, which can be employed are for example, sodium hydroxide, potassium hydroxide, and calcium hydroxide. Sodium and potassium hydroxides, and particularly sodium hydroxide are preferred.

During the course of phosgene introduction at a pH of from about 10 to about 12, and depending upon the rate of phosgene addition, the pH can be lowered to allow for the introduction of the hydroxyaryl terminated polydiorganosiloxane. The pH can be regulated by recirculating the reaction mixture past a pH electrode which regulates the rate of addition of the aqueous alkali metal or alkaline earth metal hydroxide. After the required excess of phosgene has been added, the hydroxyaryl terminated polydiorganosiloxane can be introduced. The pH of the mixture then can be raised to about 10 to about 12.

Some of the methods which can be used to eliminate any excess chloroformate groups from the reaction mixture after the addition of the hydroxyaryl terminated polydiorganosiloxane and increase in pH are for example, adding a calculated amount of a tertiary amine, such as triethylamine, or addition of a measured amount of a bisphenol.

The silicone-polycarbonate block copolymer can be made in a wide variety of either semi-batch or continuous reactors. Such reactors are, for example, stirred tank reactors, which may be either semi-batch or continuous flow. Additional reactors which are included are agitated column and recirculating loop continuous reactors.

The volume ratio of aqueous to organic phase during and at the termination of the phosgenation reaction can be in the range of about 0.2–1:1. Reaction temperatures can be in the range of between about 15°–50° C. When methylene chloride is used, the reaction may be conducted at reflux which can be 35°–42° C. The reaction can be conducted at atmospheric pressures, although sub- or super-atmospheric pressures may be employed if desired.

During phosgenation, the mixture is agitated, such as, by using a stirrer or other conventional equipment. The phosgenation rate can vary from between about 0.02–0.2 mol of phosgene, per mol of bisphenol per minute.

End-capping phenols which can be used in the practice of the present invention are monohydroxy aromatic compounds, such as phenol, p-butylphenol, p-cumyl phenol, octylphenol, and nonylphenol.

In order to avoid premature precipitation of alkali metal salt, such as sodium chloride in particular instances, there can be added along with prior to the addition of the phase transfer catalyst, sufficient water if necessary to preclude a build-up in salt concentration exceeding 25% by weight of the aqueous phase.

Recovery of the silicone-polycarbonate block copolymer can be achieved by conventional means, such by the use of an anti-solvent, or steam precipitation.

In order that those skilled in the art will be better able to practice the present invention, the following example is given by way of illustration and not by way of limitation. All parts are by weight unless otherwise indicated.

EXAMPLE

Phosgene was added to a mixture of 2.28 kg of bisphenol A, 72.2 g (0.34) moles of cumyl phenol, 40 mL of a 40% aqueous solution (0.061 moles) of $(C_4H_9)_4N^+HO^-$, 10 L of $CH_2Cl_2$, and 3.5 L of water. The reaction mixture was mechanically stirred while a pump recirculated the reaction mixture past a pH electrode and back into the reaction vessel. The phosgene was added at about 40 g/min while a chilled water condenser contained the refluxing $CH_2Cl_2$. The pH was maintained at 10.5–11 by regulating the addition of 50 wt % NaOH. After 75% of the phosgene (1.8 lbs) had been added, the pH set point was reduced to 8.0 for the remainder of the phosgenation. A total of 2.4 lbs of phosgene (1.05 eq based on bisphenols) was delivered to the reaction. There was then added 683 g of a eugenol terminated polydimethylsiloxane having an average block size of about 50 polydimethylsiloxy units. The pH of the mixture was then raised to 10.5–11. After 5 minutes, 5 mL (0.036 moles) of triethylamine was added to consume chloroformates and complete the polymerization. The organic phase was separated from the aqueous phase using a liquid/liquid centrifuge. Based on method of preparation, there was obtained a silicone-polycarbonate block copolymer having about 20 wt % of polydimethylsiloxane. The same procedure was repeated except that silicone-polycarbonate block copolymers were prepared having about 1 wt % and about 5 wt % of polydimethylsiloxane resulting from the use of the eugenol terminated polydimethylsiloxane with an average size of about 50 dimethylsiloxy units. The method used to make these silicone-polycarbonate block copolymers is referred to hereinafter as the "PTC" method.

Additional silicone-polycarbonate block copolymers having 1 wt %, 5wt %, and 20wt % polydimethylsiloxane also were prepared using eugenol terminated polydimethylsiloxane having an average length of about 50 dimethylsiloxy units employing triethylamine as a condensation catalyst in place of $Bu_4N^+HO^-$. A typical procedure, referred to hereinafter as the "$Et_3N$ Method", is as follows:

There was added 583 g, (0.14 moles), of eugenol terminated polydimethylsiloxane having an average block size of about 50 polydimethylsiloxy units dissolved in 2 L of $CH_2Cl_2$ to a mixture of 9.07 kg of bisphenol A, 75 g, (0.797 moles) of phenol, 15.0 g, (0.0688 moles) of sodium gluconate, 80.3 g, (0.794 moles) of triethylamine in 35 L of $CH_2Cl_2$ and 30 L of water. Into the resulting mixture, while it was being vigorously stirred and recirculated, there was added 4.99 kg, (50.4 moles) of phosgene over the course of 30 minutes. The pH of the aqueous phase was maintained between 10 and 11 by the addition of 50 percent aqueous sodium hydroxide solution. After purging the reaction mixture of excess phosgene by sparging with nitrogen, 30 L of $CH_2Cl_2$ was added and organic phase was separated from the aqueous phase using a liquid/liquid centrifuge. The solution was worked up by washing with 1% aqueous HCl and separating the phase with a liquid/liquid centrifuge. The solution was then washed twice with water and again separated with the liquid/liquid centrifuge. The sequence of acid and water washes was repeated as necessary to reduce residual triethylamine and chloride levels to below 5 ppm. A fine white powder was isolated by steam precipitation from the $CH_2Cl_2$ solution, and dried at 120° C. in a nitrogen fluidized bed. There was obtained, 9.1 kg,(85% yield Mn=19.4 k) of a silicone-polycarbonate block copolymer having about 5% by weight of polydimethylsiloxane.

Blends were made of Lexan® polycarbonate, manufactured by GE Plastics Co. and 5–25 parts respectively of silicone-polycarbonate block copolymer made by the PTC and the $Et_3N$ methods. These silicone-polycarbonate block copolymers each had sufficient polydimethylsiloxane blocks of about 50 dimethylsiloxy units to produce copolymers having about 20% by weight of chemically combined polydimethylsiloxane. The blends were co-extruded at about 280° C. and molded at 290° C. to produce 60 mil plaques and ⅛" test bars. The plaques were measured for transmittance and haze using an XL-835 Gardiner colorimeter. The test bars were measured for Notched Izod. The following results were obtained:

TABLE 1

Blends of Polycarbonate and Silicone-Polycarbonate

| Method | wt % siloxane | % Transmittance | % Haze | Notched Izod (−60° C.) |
| --- | --- | --- | --- | --- |
| $Et_3N$ or PTC | 0.0 | 90.2 | 1.8 | brittle |
| $Et_3N$ | 5.0 | 46.1 | 88.2 | 12.0 |
| PTC | 5.0 | 75.0 | 27.8 | 13.9 |
| $Et_3N$ | 1.0 | 67.2 | 49.0 | NA |
| PTC | 1.0 | 84.1 | 7.4 | NA |

The above results show that blends of polycarbonate and silicone-polycarbonate block copolymer made by the PTC method have superior transmittance and reduced haze when compared to polycarbonate blended with silicone-polycarbonate block copolymer made by the $Et_3N$ method.

TABLE 2

Silicone-Polycarbonate Copolymers Having 0 to 5 wt % Siloxane

| Method | wt % siloxane | % Transmittance | % Haze | Notched Izod (−60° C.) |
| --- | --- | --- | --- | --- |
| $Et_3N$ or PTC | 0.0 | 91.2 | 3.4 | brittle |
| $Et_3N$ | 5.0 | 51.1 | 63.1 | 12.5 |
| PTC | 5.0 | 86.5 | 6.9 | 13.6 |
| PTC | 1.0 | 89.0 | 5.2 | NA |

The results shown in Table 2 further illustrate the significant improvement in transmittance and reduction in haze achieved with silicone polycarbonate block copolymer made by the PTC method as compared to the $Et_3N$ method.

Although the above example is directed to only a few of the very many parameters which can be used in the practice of the method, and which can be present in the copolymers and blends of the present invention, it should be understood that the present invention is directed to a much broader variety of silicone polycarbonate block copolymers and method for making. Additional method parameters and silicone polycarbonate block copolymers are shown in the description preceding this example.

What is claimed is:

1. A method for making a silicone polycarbonate block copolymer which can be blended with polycarbonate to produce a polycarbonate blend having a haze value of less than about 30, where the silicone polycarbonate block copolymer has from about 0.5% to about 80% by weight of chemically combined polydiorganosiloxane with an average block length of about 10 to about 100 chemically combined diorganosiloxy units, which method comprises, (A) adding phosgene to bisphenol under interfacial reaction conditions and at a pH in the range of from about 10 to about 12 in the presence of an amount of a phase transfer catalyst which is effective for catalyzing reaction between phosgene and the bisphenol until about 1 to about 99 mole percent of phosgene has been added, based on the total moles of available hydroxy groups of the bisphenol, (B) lowering the pH of the mixture of (A) to a value in the range of about 8.0 to about 9.0, and while maintaining such pH range, continuing to add phosgene to the mixture until there is present at least a sufficient amount, and up to about a 5 mole % excess of phosgene which is adequate to generate enough chloroformate end groups capable of reacting with available bisphenol hydroxy groups and any hydroxyaryl groups present in the terminal position of polydiorganosiloxane subsequently added to the mixture to satisfy the desired polydiorganosiloxane weight percent requirements in the resulting silicone polycarbonate block copolymer, (C) introducing into the mixture of (B), the predetermined weight percent of the hydroxyaryl polydiorganosiloxane without additional phosgene, (D) raising the pH of the resulting mixture of (C), to a value in the range of about 10 to about 12, and, (E) eliminating any excess chloroformate groups in the mixture of (D).

2. A method in accordance with claim 1 where the phase transfer catalyst is a methyltributyl ammonium salt.

3. A method in accordance with claim 1, where the excess chloroformates are eliminated by the addition of triethylamine.

4. A method in accordance with claim 1, where the hydroxyaryl terminated polydiorganosiloxane is is a eugenol terminated polydimethylsiloxane.

5. A method in accordance with claim 4, where the block length of the eugenol terminated polydimethylsiloxane has an average of 40 to 60 dimethylsiloxy units.

6. A method in accordance with claim 1, where the bisphenol is bisphenol A.

* * * * *